United States Patent [19]

Wu

[11] 4,163,218

[45] Jul. 31, 1979

[54] ELECTRONIC MULTIPLE DEVICE CONTROL SYSTEM

[76] Inventor: William I. L. Wu, 44 Little Fox La., Westport, Conn. 06880

[21] Appl. No.: 722,543

[22] Filed: Sep. 13, 1976

[51] Int. Cl.$^2$ ............................................. H04B 3/54
[52] U.S. Cl. ................................... 340/310 A; 307/3; 325/394
[58] Field of Search ........ 340/310 R, 310 CP, 310 A, 340/408, 151, 152 R, 152 T, 505; 325/37, 394; 307/3; 179/2 A

[56] References Cited

U.S. PATENT DOCUMENTS

| | | | |
|---|---|---|---|
| 3,488,517 | 1/1970 | Cowan et al. | 340/310 A |
| 3,594,584 | 7/1971 | Woods | 340/310 A |
| 3,689,886 | 9/1972 | Durkee | 340/310 A |
| 3,702,460 | 11/1972 | Blose | 340/310 A |
| 3,729,710 | 4/1973 | Sherwin | 340/310 A |
| 3,803,491 | 4/1974 | Osborn | 340/310 A |
| 3,818,466 | 6/1974 | Honda | 340/310 R |
| 3,946,047 | 6/1976 | Antonaccio | 340/310 A |
| 3,986,121 | 10/1976 | Oehrli | 340/310 A |
| 4,007,458 | 2/1977 | Hollabaugh | 340/310 A |
| 4,024,528 | 5/1977 | Boggs et al. | 340/310 A |

Primary Examiner—John W. Caldwell, Sr.
Assistant Examiner—James J. Groody
Attorney, Agent, or Firm—Leonard H. King

[57] ABSTRACT

An electronic control system which can control the operation of a number of electrical devices such as lights, outlets, sensing apparatus, etc., all of which are energized from the same power lines. Each of the electrical devices is respectively connected to the power lines by an addressable switch unit. A central control unit is connected to the power line and generates a binary coded time division multiplex signal, including an address portion and a command portion. The encoded signal is transmitted directly onto the power lines and is received by the addressed switch, which responds to the command to control the state of the electrical device, and in turn sends a status response onto the power lines which is received at the central unit.

27 Claims, 22 Drawing Figures

FIG. 17

| CLEAR-SYNC | ADDRESS | | | | CONTROL COMMAND | | | GROUP 1 | GROUP 2 | GROUP 3 | SPARE | MODE |
|---|---|---|---|---|---|---|---|---|---|---|---|---|
| • | • | • | • | • | • | • | • | • | • | • | • | 120~ TWO PHASE CLOCK φ₄ |
| • | • | | | | | | | | | | | CLEAR = 1st HALF CYCLE (0) SYNC = 2nd HALF CYCLE |
| | | | | | | | | | | | | CHANNEL 0 |
| | • | | | | | | | | | | | CHANNEL 1 |
| | | • | | | | | | | | | | CHANNEL 2 |
| | • | • | | | | | | | | | | CHANNEL 3 |
| | | | • | | | | | | | | | CHANNEL 4 |
| | • | | • | | | | | | | | | CHANNEL 5 |
| | | • | • | | | | | | | | | CHANNEL 6 |
| | • | • | • | | | | | | | | | CHANNEL 7 |
| | | | | | | | | | | | | SENSING ONLY |
| | | | | | • | | | | | | | LIGHT COMMAND & GROUP 1 |
| | | | | | | • | | | | | | LIGHT COMMAND & GROUP 2 |
| | | | | | • | • | | | | | | ALARM GROUP 1,2 & MONITORS |
| | | | | | | | | | | | | LIGHTS OR ALARM OFF |
| | | | | | | | | • | | | | CHANNEL N GROUP 1 LIGHT OR ALARM ON |
| | | | | | | | | | • | | | CHANNEL N GROUP 2 LIGHT OR ALARM ON |
| | | | | | | | | | | • | | CHANNEL N MONITOR ON |

• = HIGH OR POSITIVE OR 1

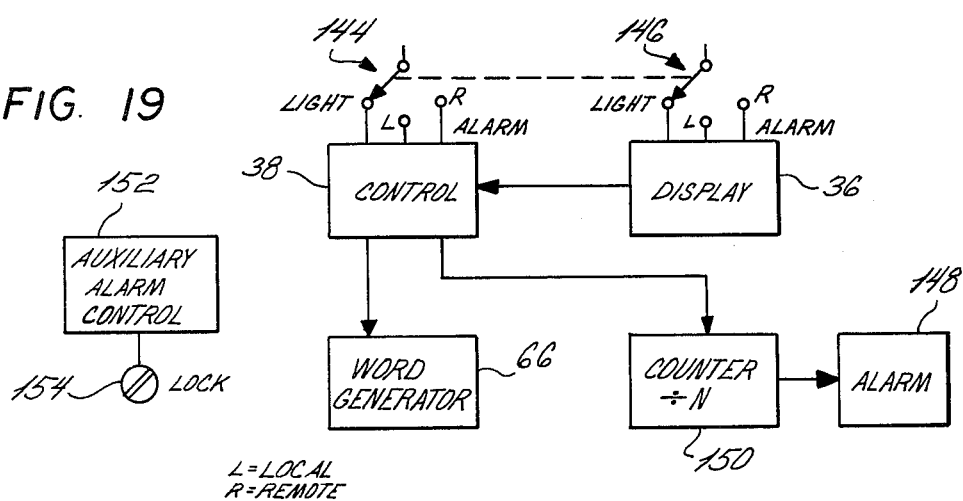

FIG. 19

L = LOCAL
R = REMOTE

FIG. 18

| CLEAR-SYNC | ADDRESS | | | | | CONTROL COMMAND | | | GROUP 1 | GROUP 2 | SPARE | MODE |
|---|---|---|---|---|---|---|---|---|---|---|---|---|
| • | • | • | • | • | • | • | • | • | • | • | • | 120~TWO PHASE CLOCK Ø₁ |
| •• | | | | | | | | | | | | CLEAR=1st HALF CYCLE (•)<br>SYNC=2nd HALF CYCLE (•) |
| | | | | | | | | | | | | CHANNEL 0 |
| | • | | | | | | | | | | | CHANNEL 1 |
| | | • | | | | | | | | | | CHANNEL 2 |
| | • | • | | | | | | | | | | CHANNEL 3 |
| | | | • | | | | | | | | | CHANNEL 4 |
| | • | | • | | | | | | | | | CHANNEL 5 |
| | | • | • | | | | | | | | | CHANNEL 6 |
| | • | • | • | | | | | | | | | CHANNEL 7 |
| | | | | • | | | | | | | | CHANNEL 8 |
| | • | | | • | | | | | | | | CHANNEL 9 |
| | | • | | • | | | | | | | | CHANNEL 10 |
| | • | • | | • | | | | | | | | CHANNEL 11 |
| | | | • | • | | | | | | | | CHANNEL 12 |
| | • | | • | • | | | | | | | | CHANNEL 13 |
| | | • | • | • | | | | | | | | CHANNEL 14 |
| | • | • | • | • | | | | | | | | CHANNEL 15 |
| | | | | | | | | | | | | SENSING ONLY |
| | | | | | | • | | | | | | LIGHT COMMAND GROUP 1 |
| | | | | | | | • | | | | | LIGHT COMMAND GROUP 2 |
| | | | | | | • | • | | | | | ALARM GROUP 1 & 2 |
| | | | | | | | | | • | | | CHANNEL N GROUP 1<br>LIGHT OR ALARM ON |
| | | | | | | | | | | • | | CHANNEL N GROUP 2<br>LIGHT OR ALARM ON |
| | | | | | | | | | | | | SPARE |

• = HIGH OR POSITIVE OR 1

ELECTRONIC MULTIPLE DEVICE CONTROL SYSTEM

BACKGROUND OF THE INVENTION

This invention relates to an electronic control system, and more particularly to a control system which can selectively control the operation of a plurality of electrical devices energized from the same power lines.

Electric lights and other electrical apparatus are generally energized by means of power lines, and are interconnected to the power lines by switches. The switch is, of course, locally controlled. However, it is frequently desired to remotely control a number of electric lights, or other electrical devices, from a central control unit. For example, in offices, factories, hospitals, etc., it is necessary to have individual switches controlling the lights in each of the respective rooms. However, it is also important to have a central station which can selectively operate each of the switches to control the lights, or other electrical apparatus, connected to the outlets. Such systems are often installed for security purposes, accident prevention, for the assistance of handicapped or sick individuals, as well as for convenience.

At present, there are two schemes available for such remote control of lights and other electrical devices. In one method, a three-way switch is installed in place of the conventional switches and a separate cable is interconnected between each of the three-way switches and the central control unit. However, because these cables interconnect directly to the power lines through the three-way switches, it is necessary to utilize shielded or BX cable for these connections. Another method is to install separate relays at each of the switch boxes and utilize unshielded, low voltage wires instead of the BX cables to interconnect the individual relays with the central control unit.

However, with prior art devices, it is necessary to install individual lines or cables from each of the switches to the central unit. As a result, the cost in both time and material becomes exorbitant. It is necessary to drill holes through walls, ceilings, floors, etc. to lay and secure the BX cable or wire. Especially when the building is already completed, such installation is often too expensive to use.

Additionally, when a change, repair or replacement is necessary in the prior art conventional systems, it is again costly and necessary to open up walls, ceilings, etc. Furthermore, if one were to sell the house and want to remove the specially installed remote control system, again the cost would be expensive and the physical damage in removing the system would impair the property itself.

Since individual wires or cables must be installed, every time an additional light, or electrical device, is to be added on to the remote unit, specially skilled labor must be hired and special tools used to install the wires or cables and, as a result, it becomes prohibitive to individually add additional switches onto the system.

SUMMARY OF THE INVENTION

It is accordingly an object of the present invention to provide an electronic control system which avoids the aforementioned problems of prior art devices.

Yet a further object of the present invention is to provide an electronic control system which can remotely control lights, electrical devices, security alarms, sensing devices and monitors.

Still another object of the present invention is to provide a remote control system for controlling individual electrical switches in a power system, which utilizes the power lines itself for such control.

Yet another object of the present invention is to provide an electronic control system for controlling the operation of a plurality of electrical devices which does not require the disfiguration or modification of the structure of the dwelling in which it is installed.

A further object of the present invention is to provide an electronic control system for controlling the operation of a plurality of electrical devices, which can be easily installed without the need of skilled labor, and wherein individual switches can be added to the system without the need of special requirements or high installation costs.

An object of the present invention is to provide an electronic control system for controlling the operation of a plurality of electrical devices which can selectively operate each of the electrical devices individually or, in case of an emergency, can operate a selected group of devices or all of the devices, either manually or automatically to turn them on and lock them, whereby the local switches will be inhibited.

Yet another object of the present invention is to provide an electronic control system for controlling the operation of a plurality of electrical devices which contains a central unit which is portable and contains individual electronic switches which can be installed in place of conventional switches.

Another object of the present invention is to provide an electronic control system for controlling the operation of a plurality of electrical devices which includes fail safe systems to prevent false light control resulting from interference, noise or electrical disturbances.

A further object of the present invention is to provide an electrical control system for controlling the operation of a plurality of electrical devices, each of which is energized from power lines and interconnected to the power lines by means of a special electronic switch. Each of the electronic switches is addressable and is capable of decoding a particular command for controlling the electrical devices. A central unit is interconnected to the power lines and generates an encoded signal which is transmitted onto the power lines. The encoded signal includes an address portion for addressing a particular switch and a command portion for controlling the operation of the electrical device by means of the switch.

Still another object of the present invention is to provide an electrical control system for controlling the operation of a plurality of electrical devices by utilizing the power lines as a transmission medium between a central unit and individual switch units, and using binary coded time division multiplex signals between the central unit and the individual switches for communicating control commands and status responses.

Another object of the present invention is to provide a method of controlling a plurality of electrical devices which are energized from power lines, by means of a central unit which generates signals onto the power lines.

These and other objects, features and advantages of the invention will, in part, be pointed out with particularity, and will, in part, become obvious from the following description of the invention, taken in conjunction with the accompanying drawings which form an integral part thereof.

The foregoing objects and features of the invention are achieved in the present invention by means of an electronic control system for controlling the operation of a plurality of electrical devices which are energized from power lines, and includes a central unit, and switch units, respectively interconnected between the power lines and each electrical device being controlled. The central unit is connected to the power lines and includes a central transceiver means for transmitting an oscillator signal onto the power lines. Also included at the central unit is a central encoding means for encoding the oscillating signal with an encoded signal for selective light control. A central control means at the central unit is connected to the encoding means for selecting the electrical device to be controlled and the desired state of that device. Each switch unit includes a switch transceiver means for receiving the encoded oscillating signals from the power lines, and a switch decoder means coupled to the switch transceiver means for detecting the encoded signal. Also included at each switch unit is a switch control means connected to the switch decoding means for setting the selected electrical device to the desired state.

In an embodiment of the invention, each of the switch transceiver means can also transmit a frequency signal onto the power lines, and each switch unit also includes a switch encoding means for encoding the oscillating signal with a signal representing the status of the electrical device. The central transceiver means can also receive the encoded oscillating signal from the switch unit through the power lines. The central unit also includes a central decoding means coupled to the central transceiver means for decoding the signal received. The resulting status information can then be displayed on the central control means.

In an embodiment of the invention, the encoded signals are binary coded time division multiplex signals containing an initiating portion, an address portion, a control portion and a status response portion.

BRIEF DESCRIPTION OF THE DRAWINGS

In the drawings:

FIG. 17 is a truth table of a ten bit, light and alarm system having eight channels;

FIG. 18 is a truth table of a ten bit, light and alarm system having sixteen channels;

FIG. 19 shows modifications needed in the central control unit to include alarms;

In the various drawings, like reference characters designate like parts.

DESCRIPTION OF THE PREFERRED EMBODIMENT

Figure 1:
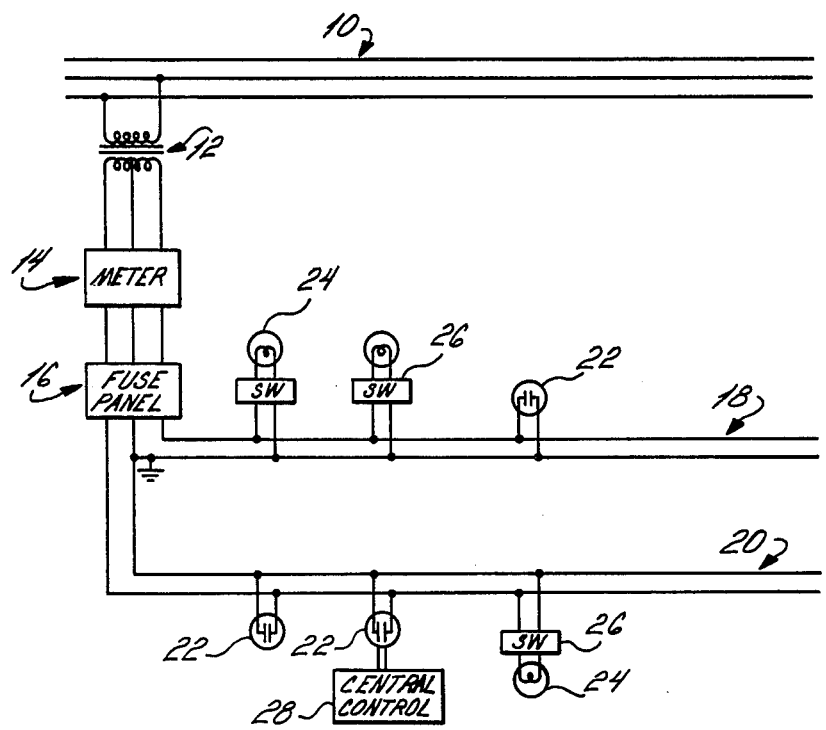
FIG. 1 is a general schematic drawing of the electronic control system of the present invention.

Referring now to FIG. 1 there is shown a typical electronic control system utilizing the present invention. The high power transmission lines 10 bring in the power to a particular house or factory. By means of the step-down transformer 12, the voltage is brought through a usual kilowatt meter 14 to the residence where it passes through a fuse panel 16 and is divided into the usual 110 volt 60 cycle, two-phase power distribution lines 18 and 20. Connected to the power lines are individual outlets 22, to which various electrical appliances can be connected. Electric light bulbs 24 are interconnected to the power lines by means of the individual switches 26. The switches 26 shown are the electronic switch units of the present invention which are adapted to replace conventional standard switches. The electronic central control unit 8 of the present invention is plugged into one of the outlets 22 interconnecting it to the power lines.

Each of the electronic switches 26, of the present invention, is made of such physical dimensions to permit them to fit into the standard switch boxes without any wiring modifications. The central unit 28 is a portable unit which can be interconnected to any of the outlets. It includes a console on which there are input switches and indicator lights through which control can be had to each of the electronic switches and through which monitoring can be had of the status of each of the lights.

Although in FIG. 1 there is shown only electric light bulbs 24 interconnected through the switches 26 to the power lines, it is understood that any other type of electrical device could be so interconnected. For example, an electrical apparatus, an electrical sensing unit, or any monitoring device, could replace the electric bulb and be so controlled. Also, by interconnecting the electric switch units of the present invention between an outlet and the power lines, the individual outlets could also be remotely controlled by means of the central unit 28.

Figure 2:
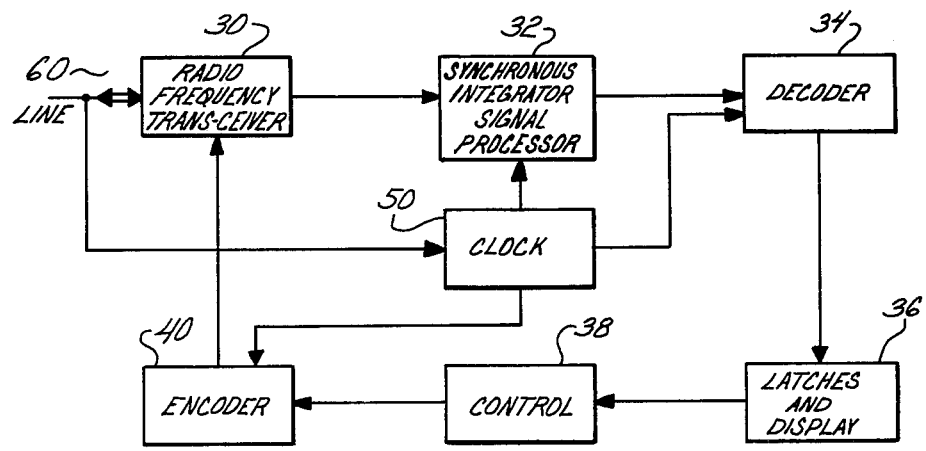
FIG. 2 is a simplified schematic diagram of the central control unit.

Referring now to FIG. 2 the basic circuitry of the central unit 28 is shown. The radio frequency transceiver 30 is connected to the power lines. It transmits and receives utilizing the same frequency, however, it operates in only the transmitter or the receiver mode alternately, but not simultaneously. The radio frequency power output of the unit is deliberately kept low, typically a few milliwatts, in order to prevent any interference with any radio, television, wireless intercoms, or computers that may be in the area and connected onto the line. In order to avoid excessive signal attenuation onto the 60 cycle power lines, the frequency of the RF signal from the transceiver 30 is typically within the rates of 40 to 200 kilohertz.

To select the particular switch to be controlled, an encoding scheme is utilized to address a particular switch and to send a particular command to that switch. The switch responds to the central unit by providing an indication of the status of the light, or other electrical device, being controlled. The signals are encoded and sent directly on to the power lines so that the power lines themselves serve as the transmission medium between the central unit and the individual switch units. In the present example, a binary coded time division multiplex transmission is utilized to achieve selective control of the lights, or other electrical devices. As is well known, although time division multiplex systems provide a simple and easily expandable type of operation, it is easily effected by impulse noises from fluorescent lamps, light switching transients, and DC motor interference from vacuum cleaners and other appliances. As a result, these noise and other transient interference make the time division radio frequency receiving system subject to false responses.

In order to eliminate the effect of noise and extraneous interference signals, a synchronous integrator, which is part of the signal processor circuit 32, receives the signals from the transceiver 30. The synchronous integrator operates with a half cycle clock frequency delay to recover the submerged signal from the electrical interferences. The output from the signal processor 32 is sent to the decoder 34 whose output sets the latches and the indicators on a display 36 on the front of a console. A control panel 38, containing the various input switches, is also contained on the console and is utilized by means of depressing keys or closing switches to select the particular light, or other electrical device, to be energized and the state in which it is to be placed. The output from the control 38 causes the encoder 40 to generate a 10 bit binary coded serial word containing the address and command. This signal then modulates the transmitter portion of the transceiver 30 and sends the signal on the power lines.

Figure 3:
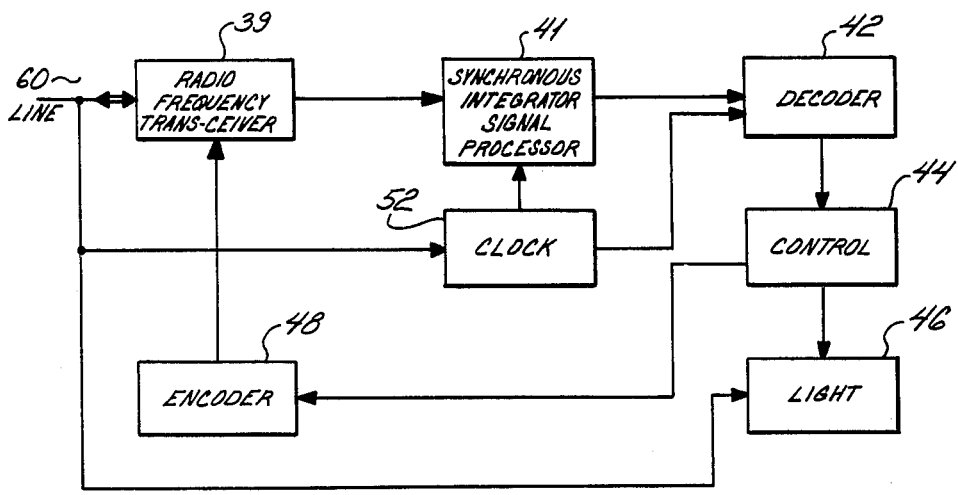
FIG. 3 is a simplified schematic diagram of an electronic switch unit.

FIG. 3 shows a simplified block diagram of a typical one of the electronic switch units which would interconnect a light, or other electrical device, to the power lines. The coded time division multiplex signal is received by the radio frequency transceiver 39 from the 60 cycle power line. The signal is then processed through the signal processor 41 which includes the synchronous integrator, and the output is decoded by the decoder 42. Part of the signal decoder will decode the control command portion of the signal, and this portion will be applied to the control 44 which consists of a solid state latching switch to set the light 46, or other electrical device, to the desired state. The encoder 48 modulates the transmitter portion of the transceiver 39 with information concerning the status of the light, or other electrical device. A clock 50 in the central unit and clock 52 in the individual switch units operate in synchronism with the line frequency and operate at a frequency which is an even multiple of the line frequency, in the present example at 120 cycles per second.

In operation, when a particular light, or other electrical device, is to be operated, the user at the central unit enters the information on the control 38. This causes the RF transceiver 30 to be modulated with a binary coded word containing the address of the switch selected and the particular control command. The signal is transmitted onto the power line and is received at the particular switch addressed. The signal is decoded at 42, and the control 44 operates the light 46, or other electrical device, in accordance with the desired state. The status is then encoded at the switch unit and transmitted back to the central unit. The central unit receives the status response, decodes it and displays the status on the indicator display 36 of the central console.

Figure 4:
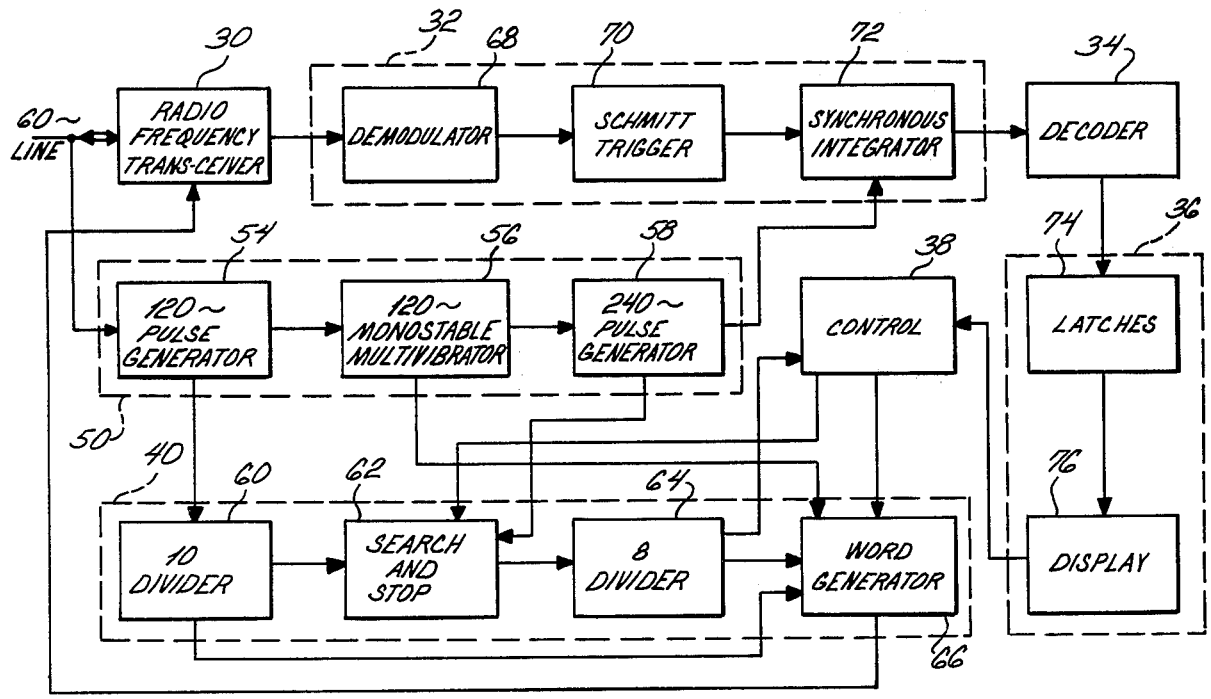
FIG. 4 is a detailed block diagram of the electronic central control unit.
Figure 5:
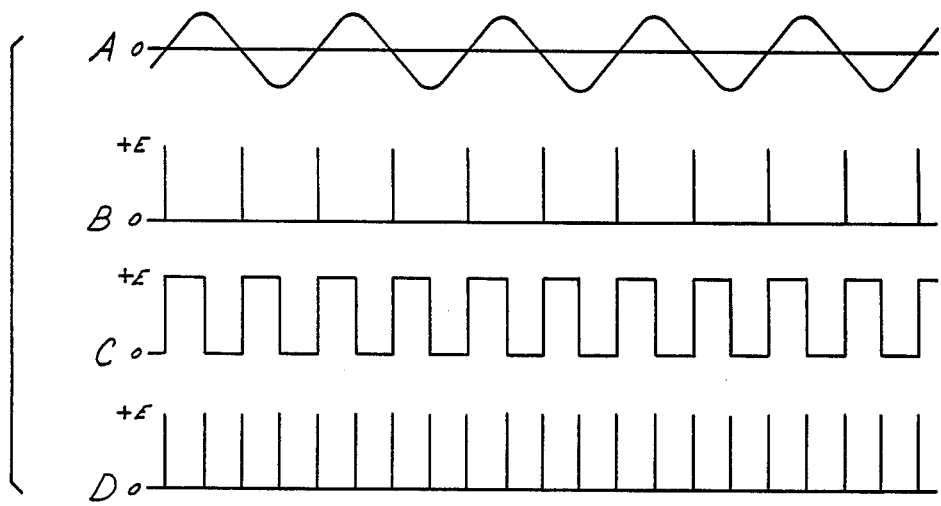
FIG. 5 shows wave forms representing the clock signals.

Referring now to FIG. 4 there is shown a more detailed block diagram of the central control unit which was briefly described in connection with FIG. 2. The clock 50 is shown to include a 120 cycle per second pulse generator 54 which is in synchronism with the 60 cycle line. The output of the pulse generator 54 feeds a 120 cycle per second monostable multivibrator 56 which in turn feeds a 240 cycle per second pulse generator 58. The operation of the clock can best be understood by referring to the wave forms shown in FIG. 5. FIG. 5A shows the 60 cycle sine wave form which appears on the power lines. FIG. 5B shows the 120 cycle pulses generated at the output of the 120 cycle per second pulse generator 54. It should be noted that the pulses in FIG. 5B coincide in time with the zero crossings of the 60 cycle sine wave indicating synchronism between the two. The output of the 120 cycle per second pulse generator 54 is applied to the monostable multivibrator 56 which produces the output shown in FIG. 5C. The multivibrator 56 has a symmetrical square wave-form of 50% duty cycle whereby the positive and negative portions of the wave-form are identical in time duration. This symmetrical 120 cycle waveform is the two-phase clock which is utilized both in the central unit and in each of the individual switch units. Although the wave-form shown in FIG. 5C is the basic clock utilized, for some of the circuitry to be hereinafter described, there is need for a 240 cycle per second pulse. This is shown in FIG. 5D which is the output waveform of the 240 cycle per second generator 58.

The clock frequency utilized in the various units is an even multiple of the line frequency. Since most 60 cycle power lines use a two-phase (180°) distribution system, it is necessary to select a clock rate which is an even multiple of the 60 cycles in order to avoid phase ambiguity. At 120 cycle clock rate, one bit is transmitted every ½ cycles of the 60 cycle line frequency. If 60 cycles, or any odd multiple of the 60 cycles is used as the clock rate, then a 180 degrees phase reversal switch would be required for phase correction.

Referring back to FIG. 4, the encoder 40 includes a 10 bits divider 60 whose output passes through a search and stop circuit 62 to enter an 8 bit divider 64. The final encoded word is produced by the word generator 66 which receives inputs directly from the 10 bit divider 60, the 8 bit divider 64 and the control unit 38. The word generator 66 is clocked by means of the monostable multivibrator 56.

Figure 6:
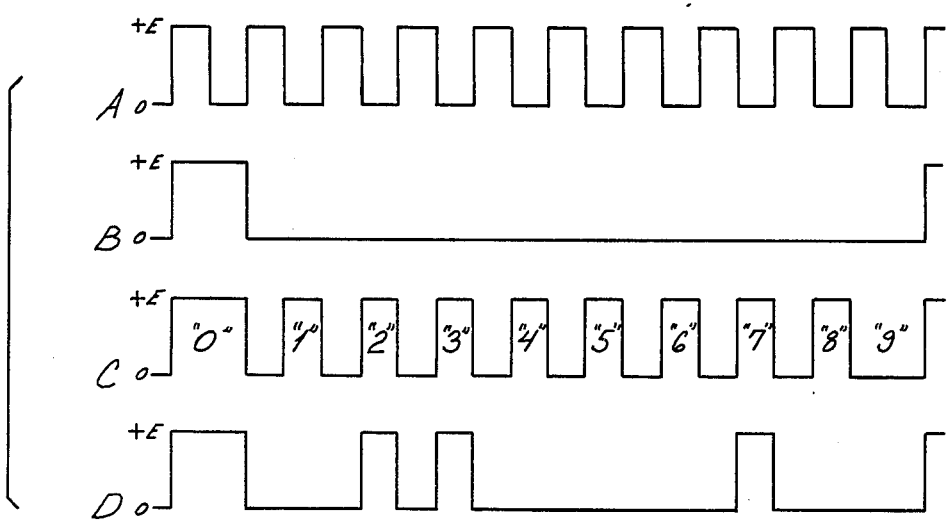
FIG. 6 shows wave forms indicating the encoded signal.
Figures 7, 8:
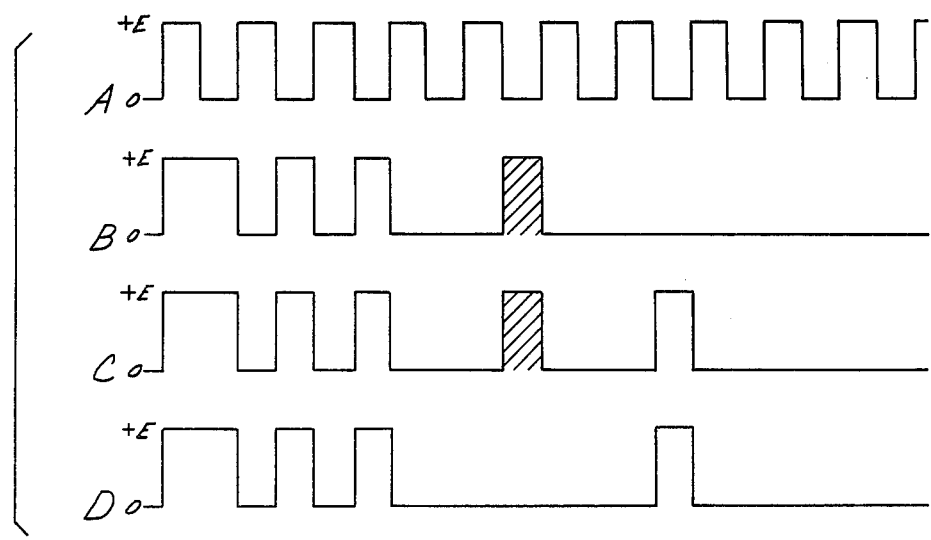
FIG. 7 is a chart showing a truth table of a ten bit serial word representing the encoded signal.
FIG. 8 shows wave forms of the dual redundant commands in sequential words.

Referring now to FIG. 7, there is shown a complete truth table for the 10 bit serial word provided by the word generator 66. Each two spaces in the chart represents a single cycle of the 120 cycle per second two-phase clock. Each of the dots represents a high, or a positive value, typically a one. Thus, on the first line of the chart, representing a phase clock $\phi_1$, it is shown that each alternate box has a positive 1. The actual waveform can be shown in FIG. 6A which shows $\phi_1$ of the 120 cycle per second two-phase clock.

FIG. 6B shows the initiating portion of the encoded word which forms a clear sync signal which occupies one complete cycle of the 120 cycle clock frequency. This can be seen in the second line of FIG. 7 which shows two dots for the first two boxes. It should be noted that the first part of this initiating portion, which is the clear signal, occurs when the $\phi_1$ of the clock is positive, while the second part of this signal which is the sync signal, occurs when the $\phi_1$ clock is negative. In fact, as will be pointed out later, it is only the first bit, the clear bit, which occurs when the $\phi_1$ clock is positive. All the other bits in the 10 bit serial word occur when the $\phi_1$ clock is negative. The clear-sync bit is the one produced by the 10-divider output 60 shown in FIG. 4.

The 8-divider 64 generates the channel address which occupies the second part of the 10 bit word of FIG. 7. There are a total of three cycles of the 120 cycle per second $\phi_1$ clock available for the address portion. The address bit only occurs during the negative portion of the clock and follows a typical binary sequence. Therefore, for the address channel zero there are no ones, as shown on the third line. For the address channel 1 there is provided a binary 1. Since there are three bits available, a total of 8 channels can be represented, the channels being designated zero through seven.

The next two bits in the word are the control portion. The system of the 10 bits truth table shown can accommodate three groups of lights with 8 channels in each group, making a total of 24 available positions. In actuality, as will hereinafter be described, only 23 lights, or other electrical devices, are utilized, and the last, or 24th, is provided as an emergency control by which all of the lights can be turned on. The control portion is therefore utilized to provide the command for each of the three groups. When no 1's are contained in the control portion, there is no command being provided and only sensing will take place whereby an inquiry will be made to the addressed channel in all three groups to determine the status of the respective channel in all three groups.

Three bits are available for the status response. A respective bit for each of the groups. A zero indicates that the lights in that channel are off, and a one indicates that the channel in that group is on. The last bit is provided as a spare.

The 8-divider 64, as shown in FIG. 4, generates the channel address portion of the 10 bit serial word. The clear-sync portion, the channel address portion and the command control portion, are all entered in parallel into the word generator 66 whose output is the 10 bit serial word shown in FIG. 7.

There are two modes of operation in the word transmission. Normally the words are in a sensing mode wherein no 1's are provided in the control portion of the word. Therefore, only the clear-sync portion and the channel address portion are sent, leaving the group 1, group 2, group 3 time slots empty for the light status response to be sent from the individual switch units.

The channel address is in sequential order from zero to 7. Each word of 10 bits occupies a 5 cycle duration of the 60 cycle line frequency which, therefore, takes 1/12 of a second. For a complete address through all of the 8 channels, it would take a total of ⅔ of a second. In the command mode operation, the clear-sync portion, the channel address portion as well as the command control portion are all utilized. Again, the time slots at the end are left empty for the light status response to be sent from the individual switch unit being addressed.

Since the channel address is sent in sequential order, there may be a maximum delay of ⅔ of a second until the proper channel address occurs. In order to speed up channel selection when a command mode is being utilized, the search and stop circuit 62 is incorporated. When a specific input is entered on the control 38 to select a particular light, the 240 cycle pulse generator output 58 is added to the input of the 8-divider 64 by means of the search and stop unit 62 until the proper channel is locked. The search and stop circuit increases the sequential channel speed 40 times. As a result, the maximum command delay of only 1 word of 1/12 of a second is achieved. Once the selector channel is obtained it will stay locked until the input is released from the control means 38.

Referring now to FIG. 6C, there is shown in time sequence, the serial 10 bit word when all of the bits are high, or ones. The numbers placed inside the wave-form identify the time sequence of the bits and the word. It can here be noted that only half of the bit zero, representing the clear-sync bit, is transmitted when the $\phi_1$ clock output is high. All of the other bits are transmitted when the $\phi_1$ clock, shown in FIG. 6A, is low. As a result, the unoccupied time slots can be used for interference automatic gain control to thereby increase the dynamic range of the receivers in both the central unit as well as the individual switch unit. The AGC control will be hereinafter explained in detail.

The zero bit, having a double width, has its first half serving as a clear bit which serves to clear various shift registers at the switch units. This is followed by the second part of the zero bit, which serves as a sync pulse at the beginning of each word. Bits 1, 2 and 3 are utilized for the 8 channel address portion of the 10 bit word. Bits 4 and 5 are utilized for the command control portion whereby either a sensing mode can be utilized, or, if 1's are entered, a particular group of lights is selected. Thus, two zeros in the fourth or fifth bit position means a sensing mode without any command for change of status. A zero-one combination indicates a change of status of the particular address channel occurring in group one. A one-zero combination would mean a change of light status of the address channel in group two, and a one-one combination means a change of light status in the address channel of group three. As will hereinafter be described, at each of the particular switch units, the switch which does the actual operating on the lights includes a divide by two or divide by three latching type switch. When a command is given by the command control portion of the 10 bit word, the latch will advance one step. If a two position switch is utilized, the change of status means on and off. In a three position switch it means on-dim-off.

Bits 5, 6 and 7 of the 10 bit word are the status response positions from the individual electronic switch units in groups 1, 2 and 3 respectively. A zero in the respective position means that the light is off, while a 1 in that position means that the respective light is on. The 9th bit is provided as a spare.

The sensing words are generated in sequential order from channel zero to channel 7 and then continuously repeat themselves. Each of the three lights in the three groups of lights having the channel address selected, will respectively respond in their designated time slot. When a command mode is utilized and a particular command is given, the word containing the address channel and the particular group selected will determine a unique light which will respond. FIG. 6D shows a typical word which includes the clear-sync bit at the beginning, identifies channel 6, does not include any command and therefore is in the sensing mode, and includes a group two response reporting that the light is on. Accordingly, the signal shown in FIG. 6D is a sensing signal reporting that the group 2 channel 6 light is on.

Referring again to FIG. 4, the signal processor 32 includes a demodulator 68, a Schmitt trigger 70 and a synchronous integrator 72. The operation of the signal processor will be hereinafter explained in connection with a similar processor contained in the individual switch units. The display 36 includes the latches portion 74 and the display portion 76.

In order to prevent the possibility of false triggering of the light, or other electrical devices, the channel address portion and the command control portion of the encoded word are sent in dual redundancy, i.e., twice in successive words as shown in FIG. 8. FIG. 8A again shows the $\phi_1$ 120 cycle clock, and FIGS. 8B and 8C are the two successive words containing the channel address and the command control signal. The command control is shown in the shaded area. Once the signal is sent, it is received by the addressed switch, which causes the light to be turned in accordance with the command instructions. At that point the switch will add the status response by placing a 1 in the appropriate group position, as shown by the addition of the one in FIG. 8C. FIG. 8D shows the final condition when the switch on the console is still depressed. In this state the command control signal has disappeared but the status response remains. By utilizing the arrangement shown in FIG. 8, blinking of the selected light or other electrical device is prevented. It should be remembered that in the command mode, only one particular light, or other electrical device, is selected. The only exception to this is in the sensing mode where the same channel in all three groups is addressed. Also, when the light emergency switch at the central control console is selected, it will lock all of the lights into an on state and disable the local switches until the emergency switch is turned off, as will hereinafter be explained.

Figure 9:
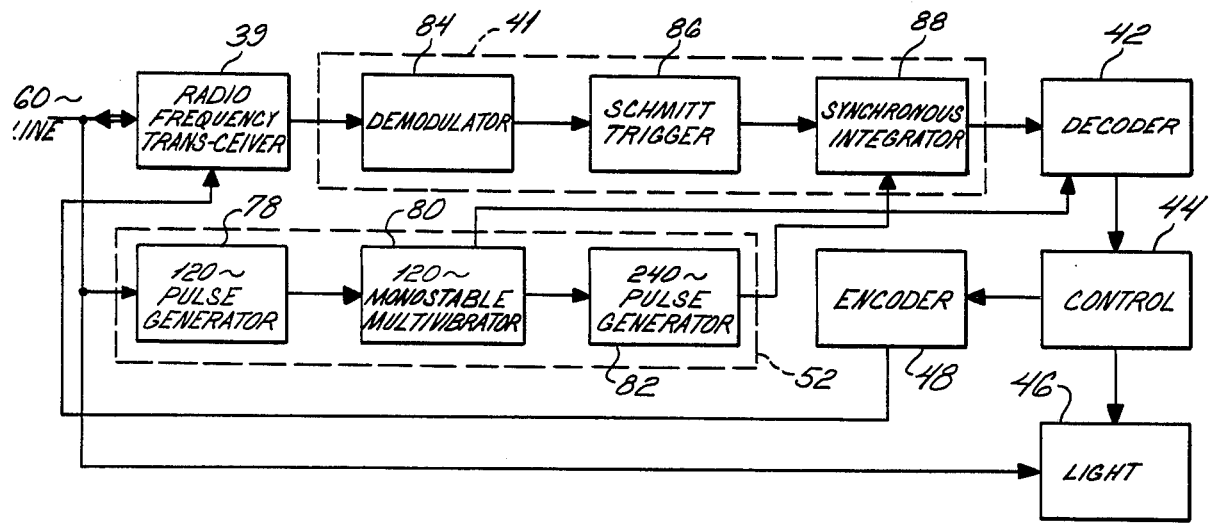
FIG. 9 is a detailed block diagram of an electronic switch unit.

Referring now to FIG. 9, there is shown a detailed block diagram of the electronic switch unit whose simplified circuit was shown in FIG. 3. The clock portion 52 is shown including the 120 cycle pulse generator 78 connected to the 120 pulse monostable multivibrator 80 and the 240 cycle pulse generator 82. The operation of the clock in the switch unit is the same as that heretofore described in connection with the central unit.

Figure 10:
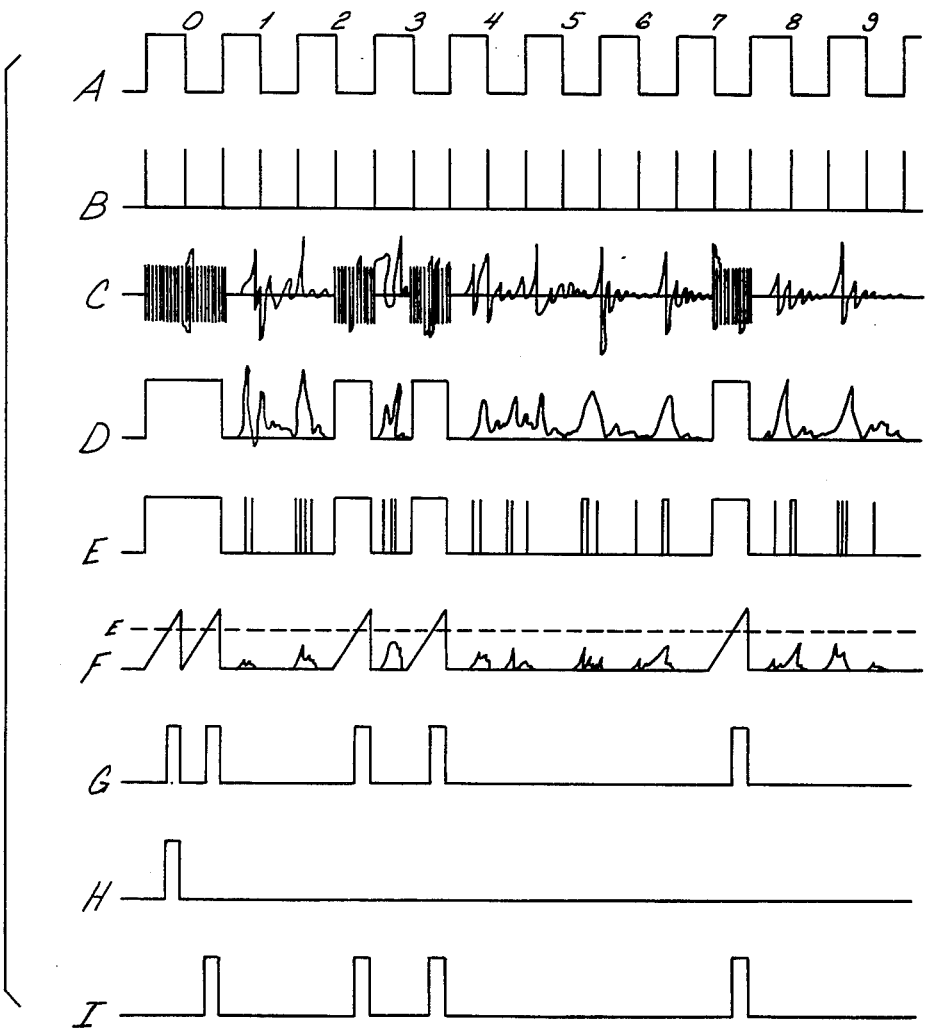
FIG. 10 shows wave forms showing the received and processed electronic signal at the switch unit.

The signal processor 41 includes a demodulator 84 connected to a Schmitt trigger 86 whose output passes through the synchronous integrator 88. The signal processor in the central unit includes the same components and will now be described in connection with FIG. 10 which shows the wave-forms of the output from different stages. FIG. 10A again shows the $\phi_1$ 120 cycle clock wave-form which is utilized in both the central and switch units. FIG. 10B shows the output of the 240 cycle pulse generator. FIG. 10C shows the amplified output of the last RF stage of the RF transceiver in the switch unit. This signal includes the modulated RF signal which is transmitted from the central unit and also includes electrical interference as can be seen in the time slots between encoded pulses.

The received signal is demodulated by means of the demodulator 84 to produce the signal shown in FIG. 10D. It is noted that the noise signals are still contained in the demodulated output. The signal then passes to the Schmitt trigger 86 whose output appears in FIG. 10E. The Schmitt trigger is an amplitude limited circuit so that the wave-form in 10E has uniform amplitude. Although the time duration of the signal information is much longer than the interference signal, nevertheless, the interference signals still appear as pulses. In order to extract the signal information with a higher signal-to-noise ratio, it is necessary to eliminate the noise disturbances. Therefore, a synchronous integration correlation technique with fixed time delay is employed to enhance the signal-to-noise ratio. This technique is carried out by the synchronous integrator 88 whose details can be better seen by reference to FIG. 11.

Figure 11:
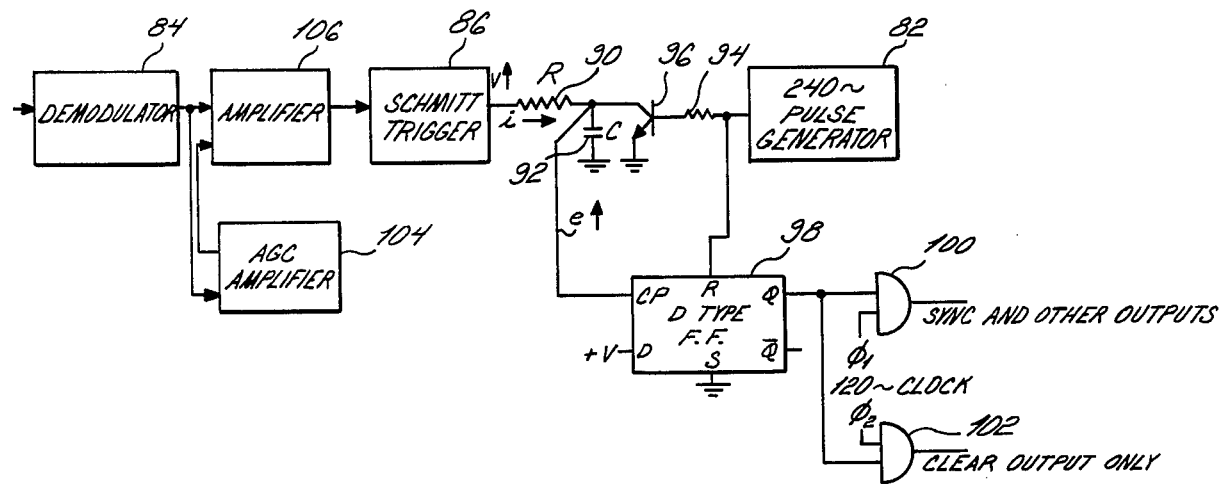
FIG. 11 is a schematic diagram of a signal processor utilized at the sensor unit and the switch unit.

In FIG. 11 there is shown one embodiment of the entire signal integrator including again the demodulator 84, and the Schmitt trigger 86. The positive output voltage from the Schmitt trigger 86, as shown in FIG. 10E, is applied to the RC integrator circuit including the resistor 90 in series with the capacitor 92. The resultant voltage e which appears across the capacitor can be expressed by the formula:

$$e = 1/c \int_0^T i\,dt \qquad \text{where } T = 1/240 \text{ sec.}$$

The voltage e is continuously clamped to zero by means of utilizing the 240 cycle pulse output from the 240 cycle pulse generator 82. These pulses pass through the base resistor 94 controlling the transistor 96. Each time a pulse appears from generator 82, it turns on the transistor 96 to clamp the integrated output to zero.

The time constant RC is chosen to be approximately $(\frac{2}{3}) \times (\frac{1}{2}f)$ seconds. Wherein f is the clock frequency. For the present example, wherein the frequency of the clock is 120 cycles, the RC time constant is 2.8 msecs. The voltage e which appears at the output of the integrator is shown in FIG. 10F. This signal is then applied to the clock input of a D type flip-flop 98. The reset input of the flip-flop 98 is connected to the output of the 240 cycle pulse generator 82; the set input is grounded and a constant voltage is supplied to the data input.

When the voltage e, shown in FIG. 10F reaches E, the Q output from the flip-flop 98 becomes positive as shown in FIG. 10G. This is followed by a reset to zero activated by the 240 cycle pulse generator.

It should be noted, that in FIG. 10G, the noise and impulse interferences which had initially occurred during the time intervals not containing a signal, are insufficient to reach the triggering level of the flip-flop 98. As a result, these noise and interference signals have been eliminated. The output of the flip-flop 98 is combined with the two phase clock signals in AND circuits 100 and 102. Combining it with the $\phi_2$ clock signal in AND 100, all of the bits together with the sync bits are produced. Combining the signal with the $\phi_1$ clock, only the clear outputs will occur. These signals are shown in FIG. 10H which indicates the clear output only from the AND 102, and FIG. 10I which shows the sync and other output signals from AND 100.

In the cases where the electrical interference becomes excessive, an automatic gain control amplifier of either feedback or feed forward type 104, as shown in FIG. 11, can be employed. This feedback or feed forward amplifier serves to decrease the sensitivity of the receiver from the average demodulated output of the receiver. Since no signal except the clear signal occupies the positive path of the $\phi_1$ clock, excessive noise will contribute heavily to the average output voltage by filling in these half cycles to desensitize the receiver. High amplitude impulse noise is limited at the demodulated output. Random interference follows a Gaussian distribution with the high peak noise occurring less frequently. As the interference becomes very excessive, the integrator will be saturated and the flip-flop 98 will generate one pulse output every ½ cycle of the 120 cycle clock. When this happens, the decoder will be inhibited and communications will be completely cut off. However, local switch control will still remain functional.

Figure 12:
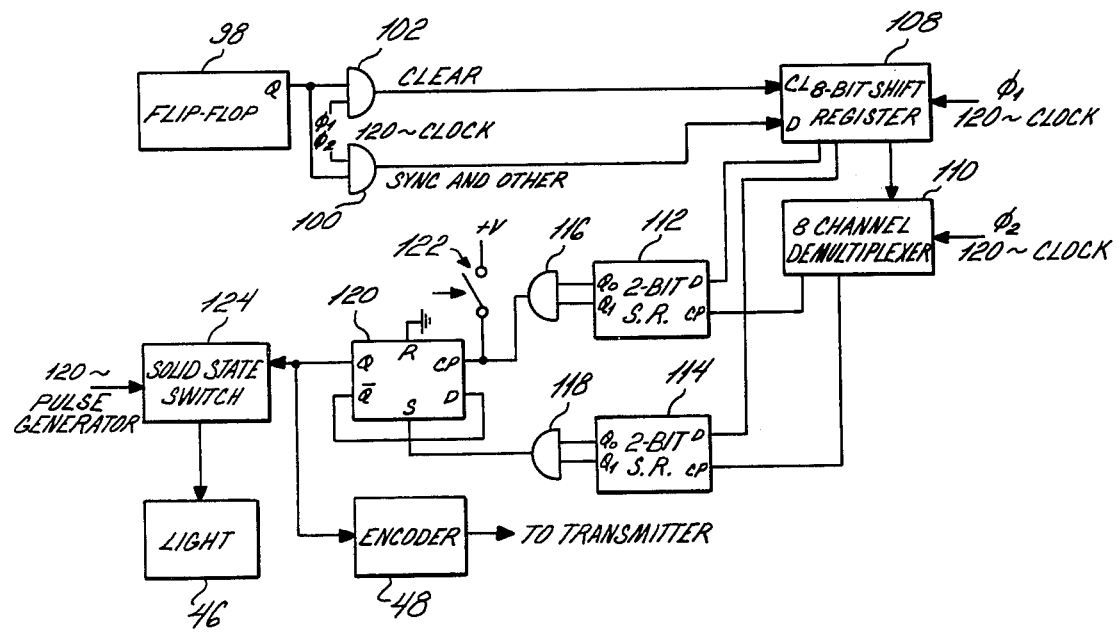
FIG. 12 is a schematic diagram of the decoder, control and switch circuit.

Referring now to FIG. 12, there is shown the detailed circuit of the decoder 42, the control 44, and the switches which are included in the individual switch units. The output from the flip-flop 98 is passed through the two AND gates 100 and 102, as heretofore described. These outputs are then applied to the 8 bit shift register 108 which also receives the $\phi_1$ clock signal. The clear pulse from AND gate 102 is sent to the clear input, and the sync and other pulses from AND gate 100 are sent to the data input of the shift register 108. By utilizing the shift register, noise jitter introduced in the signals can be eliminated.

Figure 13:
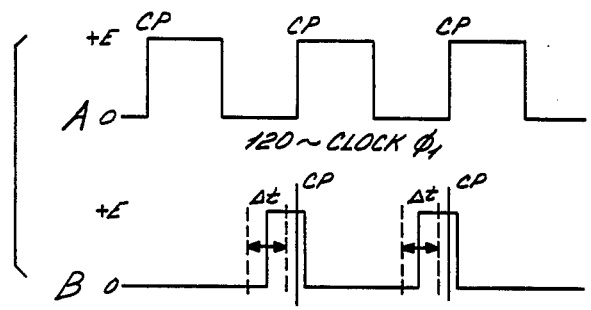
FIG. 13 shows wave forms demonstrating the time jitter introduced by noise.

Referring now to FIG. 13, there is shown again in FIG. 13A the $\phi_1$ 120 cycle clock signal. FIG. 13B shows the output time jitter of the signal at the output of the flip-flop 98 due to noise interference in the integration circuit of the synchronous integrator. The dotted lines in FIG. 13B show that there will be a time jitter $\Delta t$ at the leading edge of the pulse. The 8 bit shift register 108 operates to shift a pulse at the positive going edge of $\phi_1$ 120 cycle clock. All of the time jitter which has resulted from interference is thereby eliminated at the output of the shift register. Therefore, the original signal without interference is restored at the output of the 8 bit shift register.

Referring again to FIG. 12, when the sync bit occurs, it acts as a timing pulse within the register 108. As it is shifted through the register and it reaches the proper stage of the register which has been predetermined, the 8 channel demultiplexer 110 will be enabled. The demultiplexer receives the $\phi_2$ clock signal. The clear input to the shift register, clears it at the beginning of each word. If noise becomes too excessive beyond the range of the AGC amplifier heretofore described, spurious clear pulses will be generated and will disable all communication by preventing the sync pulses from reaching the desired stage in the shift register.

There are two 2 bit shift registers provided, 112 and 114, in order to decode the dual redundant word. The channel address and control command pulses are fed from the demultiplexer 110 and the register 108 to the inputs of the two bit shift registers 112, 114. The output from the registers being applied to the data input of the respective shift registers and the output from the demultiplexer being applied to the clock pulse input.

At the output from the 2 bit shift registers are two AND gates 116 and 118 whose outputs are applied to the clock and set input of a flip-flop 120 which is wired as a divide by 2 circuit. As was heretofore explained, when a divide by 2 circuit is utilized, the lights will be respectively switched from on to off, and reverse. When a divide by 3 circuit is utilized, a three position switch, on-dim-off, will be provided.

The control command portion of the encoded word is applied to the clock input of the flip-flop 120. Every time a positive going pulse is applied, it will change the state from zero to one, or a one to zero. There is also included momentary contact switch 122 which is a local switch. This permits local control of the lights as well as remote control.

When an emergency light control command signal is applied from AND gate 118 to the set, the input of the flip-flop 120, it will lock the light on and disable the local switch 112 until the emergency command is removed.

The Q output of the flip-flop 120 controls the solid state switch 124 which, in turn, directly controls the light 46, or other electrical device. The Q output from the flip-flop 120 also feeds the encoder 48 to modulate the transmitter as was heretofore described.

It should be noted that the time division multiplex system heretofore described in a sequential system. Unlike the individual light control command signals, the emergency light control command word repeats only once in succession to turn on all of the lights and then proceeds to sense the other lights in sequence. This pattern repeats itself. As a result, the flip-flop 120 is locked once an emergency signal is received and continues locked until the emergency command signal is removed.

With the 10 bit word and utilizing the time multiplex system as heretofore described, there is provided a total of 24 selective light controls (three groups with 8 channels each). However, as was heretofore mentioned, one of the light controls is diverted to emergency light control use. As a result, only 23 maximum light controls are available. While this probably fulfills sufficient control for most applications, if more light controls are desired, it is possible to increase the number by either shifting the clock phase, increasing the clock rate, increasing the channel and command addresses, or adding frequency division multiplex to the system.

Figure 14:
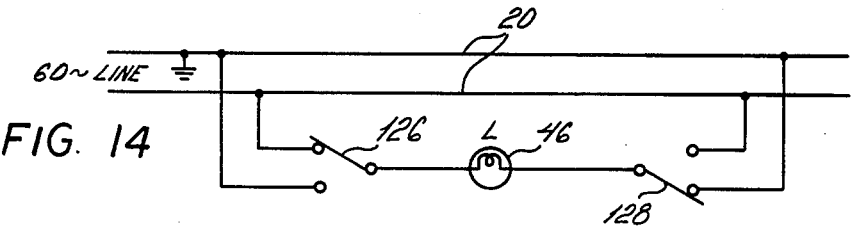
FIG. 14 is a schematic drawing of a conventional three-way switch.

The switches heretofore described were electronic switch units which can be utilized in place of the conventional light switches. However, frequently a three-way light switch is utilized. FIG. 14 shows the wiring of a standard three-way switch arrangement showing the light 46 interconnected to the power lines 20 by means of a first switch 126 and a second switch 128. As is conventionally utilized, the switches work in opposition and each one can respectively control the on-off operation of the light.

Figure 15:
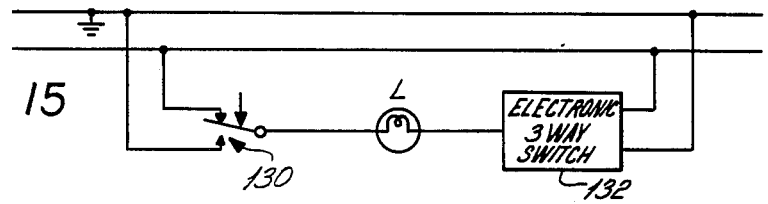
FIG. 15 is a schematic drawing showing the use of an electronic three-way switch.

The electronic switch units of the present invention can be modified so that they can be utilized as three-way switches and can still be made to physically replace the conventional three-way switch. Referring now to FIG. 15, in order to utilize the electronic three-way switch unit of the present invention, one of the conventional switches is removed and replaced by a single-pole double throw momentary contact switch 130 and the other conventional switch is replaced with a modified electronic switch unit 132.

Figure 16:
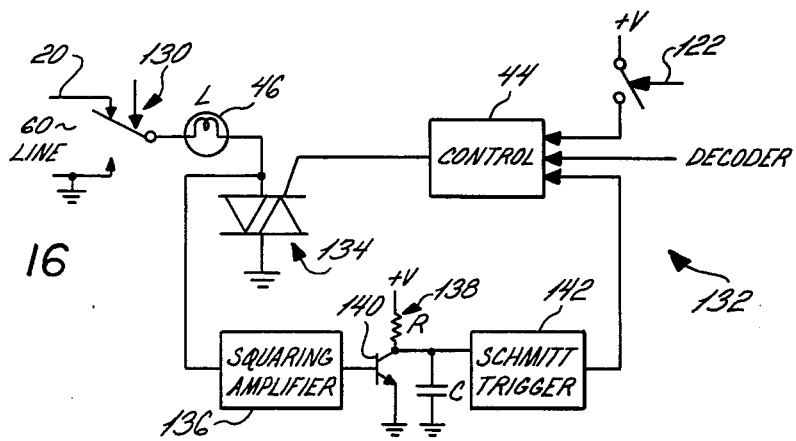
FIG. 16 is a detailed drawing of an electronic three-way switch.

Referring now to FIG. 16, there is shown more details of the modified electronic three-way switch 132. It should be understood that only those modifications to the electronic switch heretofore described are included in this figure. The remainder of the switch would include the parts heretofore described in connection with FIGS. 3 and 9. Connected between the lamp 46 and the line 20 is a bidirectional control device, shown as triac 134. A squaring amplifier 136 has as its input the 60 cycle voltage which appears across the triac 134. An integrator 138 receives the output from the squaring amplifier across a transistor 140. The integrator includes a resistor R connected to a voltage source +V and a capacitor C connected to ground. The output from the integrator passes through a Schmitt trigger 142 which is interconnected by means of the control 44 to the gate of the triac 134.

Normally, the momentary contact switch 130 is connected to the hot side of the 60 cycle line, the voltage developed across the capacitor C will not be positive enough to trigger the Schmitt trigger 142. Assuming that the light is initially off, when the switch 130 is momentarily pressed to ground, the voltage across the capacitor C rises to the +V voltage to which the resistor R is connected. This voltage is sufficient to trigger the Schmitt trigger. The positive voltage output of the Schmitt trigger will enable the control 44 to make the triac conductive and turn on the light 46.

By pressing the switch 130 again, the light will go off. It is to be noted that the switch 130 must be released before the light will go on because the light has to be temporarily disconnected. The local switch 122, which forms part of the electronic switch unit, is still available for locally controlling the operation of the lamp.

It will be evident that utilizing the electronic three-way switch of FIG. 16, there is provided local control at 2 stations; the station 130 and the station 122. This is typical of the usual three-way switches and, therefore, the present invention satisfies that conventional purpose. At the same time, there is provided the remote control by means of the central unit as heretofore described.

The electronic multiple control system heretofore described can easily be programmed according to a time sequence. Either mechanical or electrical means can be added to the central control to accomplish this function. Similarly, security devices, fire sensors and other monitors may be connected to the electronic switches to communicate alarm signals to the central control console.

Referring now to FIGS. 17 and 18, there are shown modifications of the truth table to include not only light control but also alarm and monitor controls. In FIG. 17 there is provided a 10 bit word of the 120 cycle phase clock. One of those bits are utilized for the clear-sync portion of the word. Three cycles are utilized for the address portion; two cycles are utilized for the control command portion; three cycles are provided for the status response; and a spare is included. However, in the control command portion there is provided commands for only two groups of 8 channels of lights. The third group is utilized for an alarm group and for additional monitors. As a result, the truth table in FIG. 17 accommodates 8 channel addresses, two groups of 8 lights each, 16 alarms and 8 monitors.

The truth table shown in FIG. 18 is another arrangement wherein there is provided four cycles for the channel address. This permits a total of 16 channel addresses. Two cycles are provided for the control commands and only two cycles are provided for the status response. The spare is still provided. With the arrangement shown in FIG. 18, there is a total of 16 channel addresses permitting control of two groups of 16 lights each and a total of 32 alarms.

With present alarm sensing and monitoring units, such as used in security systems or fire control systems, most of the sensing elements and monitors are hooked up in series or in parallel. For example, in a burglar alarm system, the individual sensors are connected to the doors, windows or the like and connected either in series or in parallel. Any malfunction or accidental alarm set off at one of the sensors will have to be traced throughout the entire house at each of the doors and windows where a sensing element is situated. Detecting the malfunction or intrusion and locating the particular element which has detected the intrusion, becomes a tedious and inconvenient task. By modifying the electronic multiple device control system of the present invention, alarms can be added directly to the system by connecting the sensing element to the nearest electronic switch unit and using the power lines themselves as a communication means between the sensing unit and the central control unit. The wiring is, therefore, greatly simplified and any malfunction or alarm at a particular sensing or monitor unit can be immediately traced to the particular electronic switch controlling that sensor or monitor by means of the indicator bulbs contained at the display unit on the central control console. At the same time, by utilizing the central control unit, it is possible to disable a particular sensing element or monitor if the malfunction cannot be corrected in time. Disabling the particular switch does not affect the functioning of the rest of the system.

Referring now to FIG. 19 there is shown the modifications which are needed to the block diagram of the central control console. It is to be remembered that only modifications are included, and the basic circuitry would be similar to that heretofore described in connection with FIG. 4. In order to accommodate the two separate operational modes of light control and alarm monitoring, ganged switches 144 and 146 are respectively connected to the control 38 and the display 36. The switches include a light position as well as local and remote alarm positions. When the switches are in their light position, the control command portion of the encoded word, as shown in FIGS. 17 and 18, are set to selectively provide light commands to the groups 1 and 2 lights. In this mode, all of the alarms are disabled and only selective light control is provided, as was heretofore described.

When the switches 144 and 146 are placed in their local alarm position, the sensing elements and monitors contained in the groups 1 and 2 alarms are activated and the selective light control is disabled. Such sensors and monitors can be included for detecting fire, heat, basement flood, etc. All of these monitors and sensors are connected to the alarm system by separate time multiplex transceivers at all times irrespective of the position of the switches 144 and 146.

When the switches 144-146 are either in the alarm local or the alarm remote position, all of the light controls are disabled. The control and the display units are now set only for the alarms. If no alarms are set off, all of the indicator lights on the display will be off. When an alarm occurs, the indicator light on the display corresponding to the particular electronic switch unit which has been triggered will flicker. It should be noted that in the light control mode, these same indicator lights remain on in a steady fashion. However, in the alarm mode, these lights are made to flicker at, for example, a 6 cycle rate. At the same time, an alarm will be sounded by means of the alarm 148.

When the control 38 receives an alarm from one of the electronic switch units, it locks the word generator 66 to that particular channel address so that the counter 150 can receive this signal for a predetermined N number of times in succession before sounding the alarm. This will prevent false alarms by spurious interferences.

An auxiliary remote alarm control 152 is also provided at a convenient place, such as near the door at the entrance to the dwelling. When the auxiliary alarm control is to be utilized, the switches 144, 146 are placed into their remote alarm position. The auxiliary alarm control is activated by means of inserting a key into a lock 154 provided at the entranceway or other convenient position. The auxiliary alarm control will then generate the necessary one and one bits in the control command portion of the encoded word to cause the alarm mode to become operative.

Figure 20:
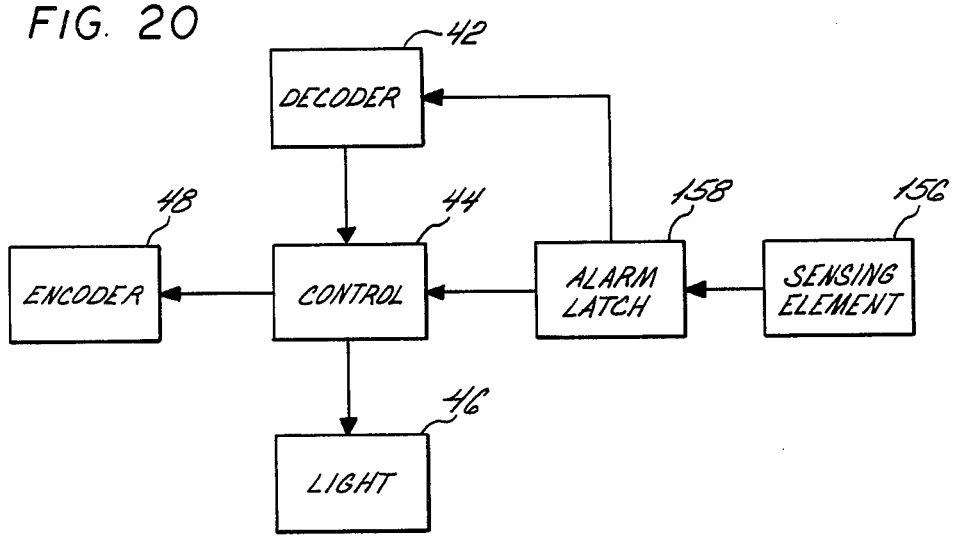
FIG. 20 shows modifications needed to an electronic switch to add alarms.

Referring now to FIG. 20, there is shown the modifications that are needed in the individual electronic switch units to accommodate the sensing and monitor elements. The sensing element 156 is connected through an alarm latch 158 to the control 44 and decoder 42. When the central unit is placed in the alarm mode, the alarm mode command is received by the alarm latch 158 and the latch becomes activated. The light mode communication is then interrupted. When the sensing element becomes activated, noting an alarm condition, the latch will latch onto the activated position and an alarm response will be transmitted to the central unit. The alarm latch is essential because the counter 150 in the central unit must count N number of times before setting off the alarm. This combination prevents false triggering of the sensing element and also maintains a constant alarm signal when a true emergency occurs. Even though the sensing element may be momentarily interrupted.

In order to reduce the physical size of the electronic switch units heretofore described, the units derive their DC power supply directly from the power lines. Since the electronic switch units are confined inside a standard BX box, all of the high voltage points are insulated. If the security alarm and monitors, with their sensing elements, are to be added to the switches, wires would conventionally be strung between the sensing elements and the switches. However, to meet the safety codes, it would be necessary to have high voltage isolation. Of course, optoelectronic isolators could be used, but then a separate low voltage DC supply would be required.

Figure 21:
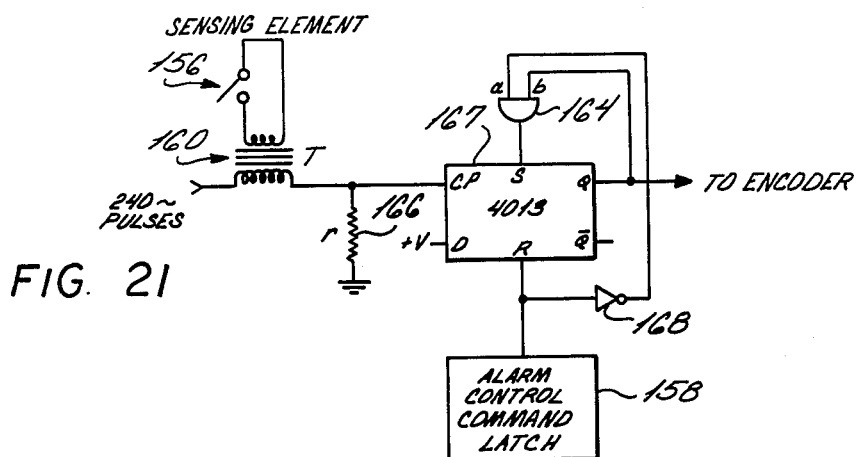
FIG. 21 shows a circuit for the high voltage isolation of a sensing element from an electronic switch.

Referring now to FIG. 21 there is shown how the sensing element of a monitor can be added and interconnected to the electronic switch units of the present invention by utilizing a pulse transformer. This meets the isolation requirements, and also performs satisfactorily without the need of a separate DC supply.

Referring now to FIG. 21, there is shown the additions needed to an electronic switch unit in order to add the sensing element of an alarm or monitor. The sensing element 156 is shown as a type being normally open. However, it will be evident that normally closed elements could also be utilized with simple modifications. The element is connected across a pulse transformer 160. The secondary of the pulse transformer is interconnected between the output of the 240 cycles of the pulse generator, and a flip-flop 167. Flip-flop 167 is shown as being half of a CMOS 4013 D-type-flip-flop. A resistor 166 is connected between the control pulse input and ground.

Normally when the control command from the central unit is in its light mode, the alarm control command latch output 158 is positive, or 1. Flip-flop 162 is clamped at the reset R so that the output at Q is zero. An inverter 168 passes the inverted signal through AND gate 164 at the a input, and sends it to the set control of the flip-flop. As a result, the a input to AND gate 164 will be zero and the set input to flip-flop 162 would also be zero.

When the control command is placed in its alarm mode, the reset will be at zero. The input a to the gate 164 will be positive. If the sensing element is open and unactivated, the inductance of the transformer 160 will be high and a very small amplitude of the 240 cycle pulses appears across the resistance 166 to the input of the trigger of the flip-flop 162. As a result, the flip-flop 162 will still produce a zero output at Q. However, when the sensing element becomes activated and closes, the inductance of the transformer 160 becomes almost zero and the full 240 cycle pulse voltage now appears across the resistor 166 to trigger the flip-flop 162. The Q output will now be positive and an alarm will be transmitted. The AND gate 164 will apply a positive voltage to reset the S input and thereby latch the Q output to its positive portion. Release of the flip-flop comes when the alarm mode control command is altered. It should be noted that in the light mode, the condition of the sensing element is unimportant.

Figure 22:
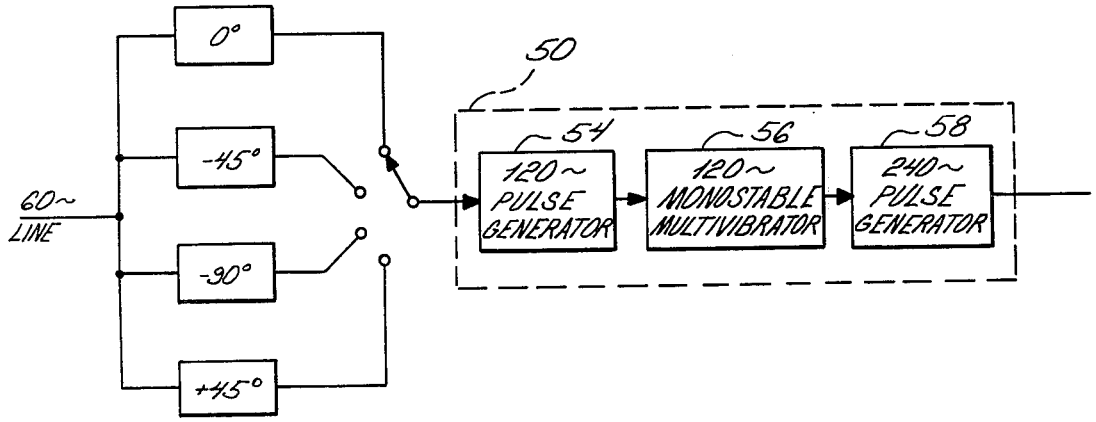
FIG. 22 shows a phase shifting circuit.

The truth table on FIG. 7 indicates a total of 24 individual controls. Since the time division multiplex system is synchronous to the clock and signal processing includes integration, a shift of clock phase between the central control unit and the electronic switch of more than 30 degrees will render the system inoperative. Therefore, the number of individual controls can be safely expanded to 4 times 24 or 96 by shifting the clock phase at the central control unit in 90 degree segments. Only the phase synchronous electronic switches will subject to control. One arrangement is shown in FIG. 22. Since the clock rate is 120 cycles only half of the phase shift is necessary at 60 cycle line frequency. Each of the four phase networks will regulate 24 controls. The figure shows manual phase shift, however, for which an automatic switching can be easily substituted.

There has been disclosed heretofore the best embodiments of the invention presently contemplated. However, it is to be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. An electronic control system for controlling the operation of a plurality of electrical devices which are energized from AC power lines, said control system comprising:
   (a) a single central unit connected to the power lines and including:
      (1) central transceiver means for transmitting an encoded oscillating signal of one frequency onto the power lines;
      (2) central encoding means for encoding said oscillating signal with an encoded signal in synchronization with the frequency of the AC power for selective control of electrical devices;

(3) central control means connected to said encoding means for selecting the electrical device to be controlled and its desired state;

(b) unitary switch units respectively interconnected between power lines and each electrical device being operative for both local and centralized control of the electrical device with the local control and the centralized control placing the electrical device in respective opposite states from each other, each switch unit including:

(4) switch transceiver means for receiving the encoded oscillating signal from the power lines;

(5) switch decoding means coupled to the switch transceiver means for detecting the encoded signal;

(6) switch control means connected to said switch decoding means for setting the selected electrical devices to the desired state, and (7) local control means for selectively locally operating the electrical device independently of the central unit and placing the electrical device in a state opposite from that which it was placed by the central unit.

2. An electronic control system as in claim 1 and wherein each of the switch transceiver means can also transmit an encoded oscillating signal onto the power line, each switch unit further including switch encoding means for encoding the oscillating signal with the status of the electrical device, and wherein said central transceiver means receives from the power line encoded oscillating signals from the switch units, said central unit further including central decoding means coupled to said central transceiver means for decoding the received signals and for displaying the status of the electrical device on the central control means.

3. An electronic control system as in claim 1 and wherein said central unit and each of said switch units respectively include a signal processor connected to its transceiver, said signal processor comprising demodulator means for separating the oscillating signal from the encoded signal, said separated encoded signal containing any noise and interference, limiting means for amplitude limiting the separated encoded signal, synchronously integration means for integrating the amplitude limited signal, and trigger means connected to said integration means and producing a pulse output when the integrated signal reaches a threshold value, whereby the noise and interference signals are substantially eliminated.

4. An electronic control system as in claim 3 and further comprising a noise automatic gain control interconnected to the said demodulator; since all informations are transmitted on a particular half of the clock cycle and only a clear bit on the other half of the clock cycle, any noise present after demodulation will increase the average output by increasing the clear bit half cycle output to reduce the receiver sensitivity, thereby preventing false signal and increasing dynamic range.

5. An electronic control system as in claim 3 and wherein said encoded signal is a clocked signal, and wherein said signal processor is synchronized with the clocked signal, whereby the output pulse from said trigger means is effectively utilized for the encoded signal.

6. An electronic control system as in claim 5 and wherein said limiting circuit is a trigger circuit, and further comprising a transistor means connected across the integration means operating to clamp the integration means output to a fixed level, and pulse generator means synchronized with the clocked signal and connected to operate said transistor means.

7. An electronic control system as in claim 6 and wherein said pulse generator means operates at a rate which is a multiple of the clocked signal.

8. An electronic control system as in claim 6 and further comprising shift register means receiving the output of said trigger circuit and clocked in synchronism with said clocked signal, to thereby provide an output which eliminates time jitter due to noise interference in the integration means.

9. An electronic control system as in claim 1 and wherein said central unit and each of said switch units includes a clock means for providing a time base for the encoded signal, and wherein said output of said clock means is at a rate which is an even multiple of the line frequency.

10. An electronic control system as in claim 9 and wherein each of said clocks comprise a first pulse generator operating at a frequency N times the line frequency, wherein N is an even integer, and a trigger circuit operating at the same frequency as said first pulse generator for producing a symmetrical square wave-form of 50% duty cycle.

11. An electronic control means as in claim 10 and further comprising a second pulse generator operating at twice the frequency of said first pulse generator, and wherein said central unit and each of said switch units respectively includes a signal processor for synchronous integration of the encoded signals to improve the signal-to-noise ratio, the output of said second pulse generator being applied to said signal processor.

12. An electronic control system as in claim 2 and wherein said encoded signal is a binary coded time division multiplex signal for selective light control and operating at a clocked rate, and wherein the encoded signal includes an initiating portion, an address portion, a control portion and a status response portion.

13. An electronic control system as in claim 12 and wherein said central encoding means includes first divider means for forming the initiating portion of said encoded signal, and a second divider means for forming the address portion of said encoded signal, said central control means forming the control portion of said encoded signal, and wherein said switch encoding means forms the status response portion of said encoded signal.

14. An electronic control system as in claim 13 and wherein said central encoding means further includes search means responsive to said switch control means and operating with said second divider means for forming the address portion of said encoded signal, said search means operating at a frequency substantially faster than the clocked rate of said encoded signal to thereby increase the speed for forming the encoded signal.

15. An electronic control system as in claim 12 and wherein said central transceiver means includes means for transmitting the encoded oscillating signal in dual redundancy to prevent false triggering of the selected electrical device.

16. An electronic control system as in claim 15 and wherein said switch decoding means includes first and second shift registers to decode said dual redundant signals, gating means for combining said dual redundant signals, and divider means receiving the output from said gating means and applying the control portion of the encoded signal to said switch control means.

17. An electronic control system as in claim 1 and wherein said central control means includes a console having input means for selecting the electrical device to be controlled and the state desired, and display means for displaying the status of each electrical device.

18. An electronic control system as in claim 1 and wherein said control unit further comprises emergency control means for simultaneously operating all of the electrical devices over-riding and blocking the local control.

19. An electronic control system as in claim 1 and wherein said power lines carry an AC energizing signal of a given line frequency, and wherein the frequency of said oscillating signal is substantially higher than said line frequency.

20. An electronic control system as in claim 1 and wherein at least one of said switch units is an electronic three-way switch for interconnecting one end of the electrical device with the power lines, and including a single pole double throw contact switch for interconnecting the other end of the electrical device with the power line.

21. An electronic control system as in claim 20 and wherein said electronic three-way switch further comprises a bidirectional device having a main flow path connected between the electrical device and the power lines, and a control path connected to the switch control means, a squaring amplifier means connecting to the electrical device, a transistor means connected to the output of said squaring amplifier means, an integrating circuit coupled to the output of the transistor means, and a trigger circuit connected across the integrating circuit output, the output of the trigger circuit passing through the switch control means to turn on said bidirectional device.

22. An electronic control system as in claim 2 and wherein the electrical devices controlled include lights, security alarms and monitors.

23. An electronic control system as in claim 22 and wherein said central unit includes operational switch means having at least a first position providing control of the lights, and a second position providing control of the alarms and monitors.

24. An electronic control system as in claim 23 and further comprising means for locking the central unit to a particular monitor, counting means for counting a predetermined number of status signals received from the particular monitor, and alarm means for announcing an alarm signal after said predetermined number has been reached.

25. An electronic control system as in claim 24 and wherein at least one of said switch units includes a monitor activated upon sensing a particular alarm condition, and latching means for maintaining a particular output state upon activation of the monitor.

26. An electronic control system as in claim 23 and wherein a monitor is connected to at least one switch unit, and further comprising pulse transformer means for coupling the monitor to the switch unit, a trigger circuit activated when said operational switch is in said second position, and means for triggering said trigger circuit upon activation of the monitor.

27. An electronic control system as in claim 1 and wherein said encoding means encodes information on one half of the cycles, and encodes a clear signal on one part of the other half of the cycle, and wherein said central unit and each of said switch units comprise an automatic gain control unit for clearing out noise from the other parts of the other half of the cycle.

* * * * *